United States Patent [19]

Sprenger et al.

[11] Patent Number: 5,395,075
[45] Date of Patent: Mar. 7, 1995

[54] STAIR AND STAIRWELL CONSTRUCTION FOR CONNECTING TWO DECKS IN AN AIRCRAFT

[75] Inventors: Wilfried Sprenger, Issendorf; Ralf Schliwa, Hamburg; Hans-Juergen Mueller, Henstedt/Ulzburg, all of Germany

[73] Assignee: Deutsche Aerospace Airbus GmbH, Hamburg, Germany

[21] Appl. No.: 93,314

[22] Filed: Jul. 16, 1993

[30] Foreign Application Priority Data

Jul. 16, 1992 [DE] Germany .................. 42 23 320.8

[51] Int. Cl.⁶ ............................................. B64D 11/00
[52] U.S. Cl. .............................. 244/118.5; 244/129.6; 49/33; 52/186; 182/77
[58] Field of Search .................... 244/118.5, 129.6; 182/77, 78, 79, 80, 81; 49/33; 52/183, 186

[56] References Cited

U.S. PATENT DOCUMENTS 3,100,915  8/1963  Pennington et al. ............... 52/186

FOREIGN PATENT DOCUMENTS

| 177552 | 7/1953 | Austria ............................ 182/77 |
| 2341716 | 9/1977 | France ............................ 52/183 |
| 654212 | 1/1935 | Germany ......................... 182/79 |
| 53-27299 | 3/1978 | Japan .............................. 182/77 |
| 280767 | 2/1952 | Switzerland .................... 182/81 |
| 2106167 | 4/1983 | United Kingdom ............ 182/77 |
| 498213 | 3/1976 | U.S.S.R. ......................... 244/129.6 |

*Primary Examiner*—Michael S. Huppert
*Assistant Examiner*—Anne E. Bidwell
*Attorney, Agent, or Firm*—W. G. Fasse; W. F. Fasse

[57] ABSTRACT

A stair and stairwell construction for interconnecting two different decks, especially in an aircraft, includes stair treads, stringers, and a stairwell enclosure or housing. At least one of the just enumerated components is constructed to be positionable or tiltable relative to the planes defined by the decks. One of these components is positionable into an open position, thereby providing a passageway, or into a closed position thereby blocking the passageway. In both positions, this positionable component is lockable.

11 Claims, 5 Drawing Sheets

STAIR AND STAIRWELL CONSTRUCTION FOR CONNECTING TWO DECKS IN AN AIRCRAFT

FIELD OF THE INVENTION

The invention relates to a stair and stairwell construction which is used for interconnecting two decks, especially in an aircraft. The construction includes a stair with treads held in place by stringers and enclosure elements for safety purposes.

BACKGROUND INFORMATION

Stair and stairwell constructions of the type mentioned above are especially used in jumbo type aircraft in which at least two decks are interconnected by stairs. The construction of such stairs and their position relative to emergency exits are subject to official regulations which aim at making sure that in an emergency the distances to be traversed between such a stair and the next available emergency exit are as small as possible so that passengers and crew may reach these emergency exits as quickly as possible. Conventional constructions of this type have rigid stairwell enclosure housings which are not suitable for installation near emergency exits. There is also room for improvement with regard to the space requirements for such structures, especially floor space near an emergency exit.

OBJECTS OF THE INVENTION

In view of the foregoing it is the aim of the invention to achieve the following objects singly or in combination:

to construct a structure of the type described above in such a manner that a convenient and rapid access to an emergency exit is assured even if the structure is positioned close to such an exit;

to construct such a stair and stairwell unit in such a manner that its arrangement at different locations within the aircraft body is more flexible than heretofore;

to construct the stairwell structure in such a way that it will provide in an emergency the free space necessary in front of an emergency exit; and to make at least certain components of the structure movable or even portable for positioning in different positions.

SUMMARY OF THE INVENTION

The above objects and advantages have been achieved according to the invention in that the stair construction includes a stationary or fixed housing component and a movable or positionable housing component, wherein the latter can be placed in any one of at least two operative positions. In a first position the movable housing component provides a passageway through the stairwell construction while in the other position the movable housing component functions as a blocking device for preventing a person from passing through the stair construction. In both positions the movable housing component can be fixed or locked. At least one of such movable or positionable components is incorporated into the stair and stairwell construction.

Due to the fact that the movable housing component is selectively positionable, it is now possible to use such a stair structure even in a location within an aircraft where in an emergency a sufficiently large stepping area must be provided. When an emergency situation should occur, it is now possible to remove the positionable or movable housing component out of the stepping area in front of the emergency exit or from the area of an emergency passage. By providing the possibility of locking the movable housing component either in a passage position or in a blocking position, uncontrolled movements of the elements or components of the stair construction and the possibilities of accidents are minimized or eliminated.

For minimizing the mass or weight that needs to be moved when position changes are to be made, the invention teaches that at least one of the enclosure or housing components of the stair enclosure or stairwell housing is movable and hence positionable, but more than one component may be movable. In one embodiment, the stairwell housing comprises one fixed component and at least one positionable component constructed for cooperation with the fixed component.

For an improved safety within the aircraft it is preferable that the area where the present stair enclosure is located, is provided with at least one flap for closing the respective floor area when the stair casing is moved into another position. Preferably, the flap is constructed as a two section or two component flap door.

The possibility of repositioning the present stairwell housing is improved in that at least one of the components of the stairwell housing is mounted in a tiltable manner so that it may be turned into an out of the way position. Further, the number of components for the entire structure can be reduced in that the upper cover of the staircase housing is constructed for people to walk on such upper cover when the cover is in one of its two possible positions.

In order to save space, which is always at a premium in an aircraft even in a large bodied aircraft, the positionable component of the present structure is preferably constructed of a plurality of sections that are foldable relative to each other. Preferably, at least one of these foldable sections is constructed as a floor element when the sections are in a folded-in condition.

In another preferred embodiment the stringers of the stairs and the treads are constructed as a unit which is foldable or tiltable into a recessed position. A barrier against smoke propagation is achieved in that the individual stair treads are journalled to the stringers in a tiltable manner. The treads, as well as the stringers, may bear against a seal in the tilted position of these components of the present structure.

For an improved operability and positionability, the present structure is provided with a brake mechanism activatable through a lever system, e.g. a movement damper and a handle.

The fire protection characteristics of the aircraft are improved by making at least one of the position variable components as a fire protection member made of particularly fire resistant material.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
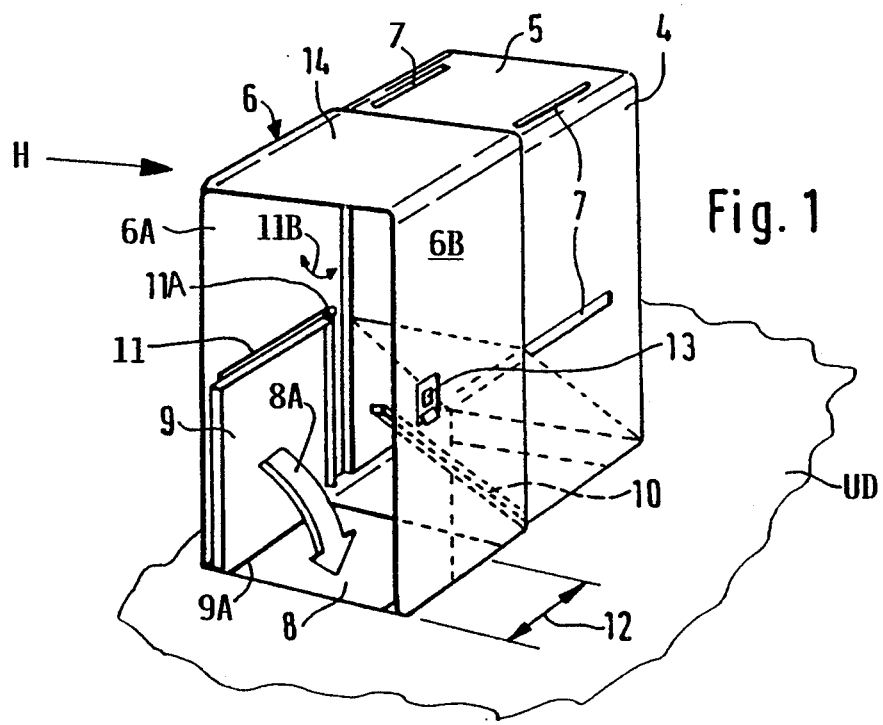
FIG. 1 shows a perspective view of a stair and stairwell structure including a fixed housing component and a position variable, displaceable component performing several functions.
Figure 3:
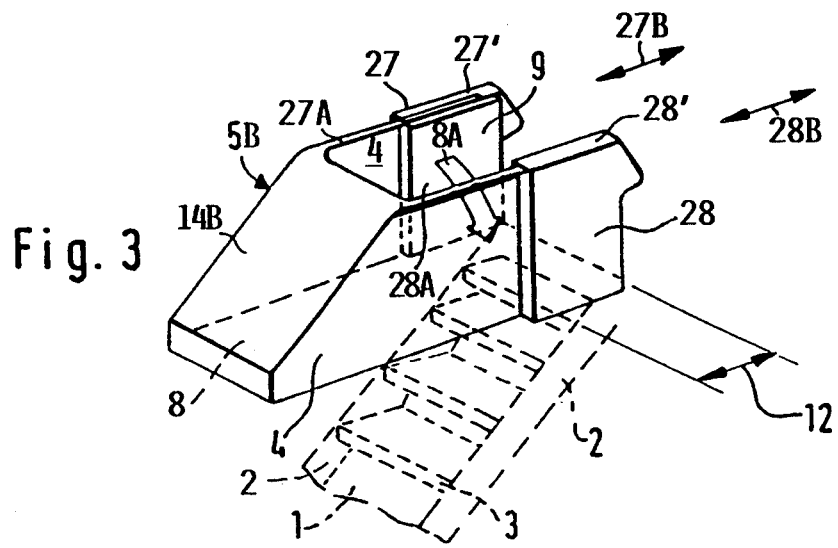
FIG. 3 is a perspective view of an embodiment of a stairwell housing including an upper cover for covering at least a portion of a stairwell enclosure.

FIG. 1 shows a first embodiment of a stair and stairwell construction for connecting an upper deck UD with a lower deck LD in an aircraft A. The lower deck LD and the aircraft A are merely shown symbolically in FIG. 5. The structure includes a stair 1 with stringers 2 and treads 3 mounted to the stringers as shown in FIG. 3. A stairwell housing H normally encloses an opening 8 in the upper deck UD through which the stair 1 is normally accessible for passing from the upper deck UD to the lower deck LD and vice versa. The stair and stairwell construction comprises at least one movable housing component which is positionable relative to a surface of said upper deck. In the embodiment of FIG. 1, the positionable housing component is part of the stairwell housing H which includes a stationary or fixed housing component 5 and the positionable component 6 having side walls 6A and 6B and a top cover 14. The fixed housing component 5 has side walls 4 and guide rails 7 for guiding the movement of the positionable housing component 6 back and forth in the direction of the double arrow 12. A lock and handle mechanism 13 locks the movable or positionable housing component 6 relative to the fixed housing element 5 in the fully extended position shown in FIG. 1 and also in the retracted position not shown. In the fully extended position of the housing component 6, the stair is accessible through the opening 8 as indicated by the arrow 8A. The movable or positionable component 6 is so dimensioned that it fits over the stationary element 5 of the housing H.

When the movable component 6 is in the retracted position, thereby enclosing the stationary component 5, the passage through the opening 8 is prevented by a flap door 9 hinged at 9A to the upper deck UD. The flap 9 is tilted downwardly to cover the opening A, whereby a section of floor space as indicated by the double arrow 12 is gained, for example, in an emergency in which the stairs are no longer to be used and more floor space is required, for example, in front of an emergency exit not shown.

It is also required by many regulations that the front opening of the stairwell housing is at least partly closed when it is recessed. Therefore, a further movable component, such as a panel 11 with a vertical hinge 11A connected to the stationary housing element 5, can be opened and closed as indicated by the arrow 11B.

A hand rail 10 shown partly in dashed lines in FIG. 1 is either retractable or foldable to permit the movement of the positionable component 6 as described above.

Rather than hinging the panel 11 as shown at 11A, it is possible to provide the panel 11 with hooks or holes and the stationary housing component 4,5 with corresponding devices, such as holes or hooks to be engaged by the respective devices of the panel when the latter is placed to cover at least partly the front opening of the stationary housing component 5.

Figure 2:
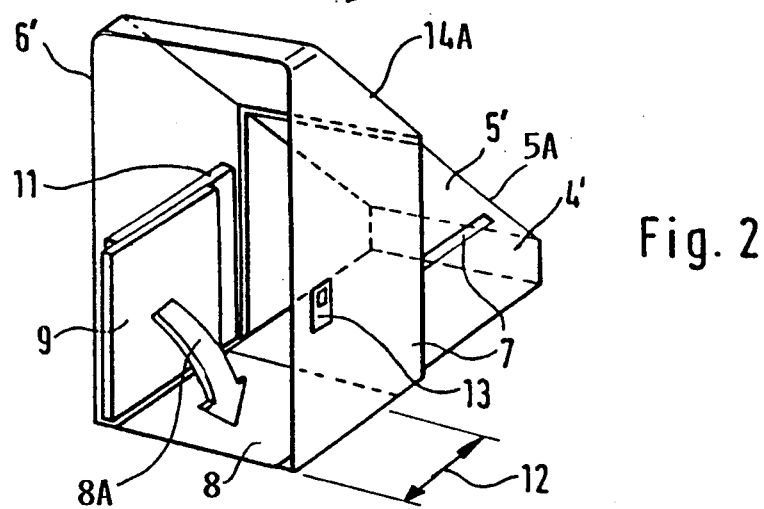
FIG. 2 is a perspective view similar to that of FIG. 1, but illustrating a stairwell construction in which both the movable or positionable component and the stationary component have a slanted roof.

FIG. 2 shows an embodiment quite similar to that of FIG. 1, however, the stationary or fixed housing component 5' with its side walls 4' and the positionable or movable housing component 6' both have a slanted roof 14A and 5A respectively. Otherwise the construction of and operation of the embodiment of FIG. 2 is the same as that described above for FIG. 1. When the positionable housing component 6' is moved to the rear to enclose the stationary housing component 5', the floor space 12 is regained when the flap 9 and the panel 11 are in their closed position closing-off opening 8.

FIG. 3 illustrates a further embodiment in which the stairwell housing includes a stationary or fixed housing element 5B with a slanted roof 14B covers an opening 8 in the upper deck UD through which the stair 1 is accessible for passage. The embodiment of FIG. 3 includes two movable or positionable housing components 27 and 28 each having an upper guide portion 27' and 28' riding on respective guide rails 27A and 28A forming part of the side walls 4 of the housing 5B. These movable components 27 and 28 are movable back and forth as indicated by the arrows 27B and 28B. In operation, once the flap 9 is tilted down, the movable components 27, 28 are moved into their leftmost position in FIG. 3, thereby freeing additional floor space 12. Component 28 may carry a panel 11.

Figure 4:
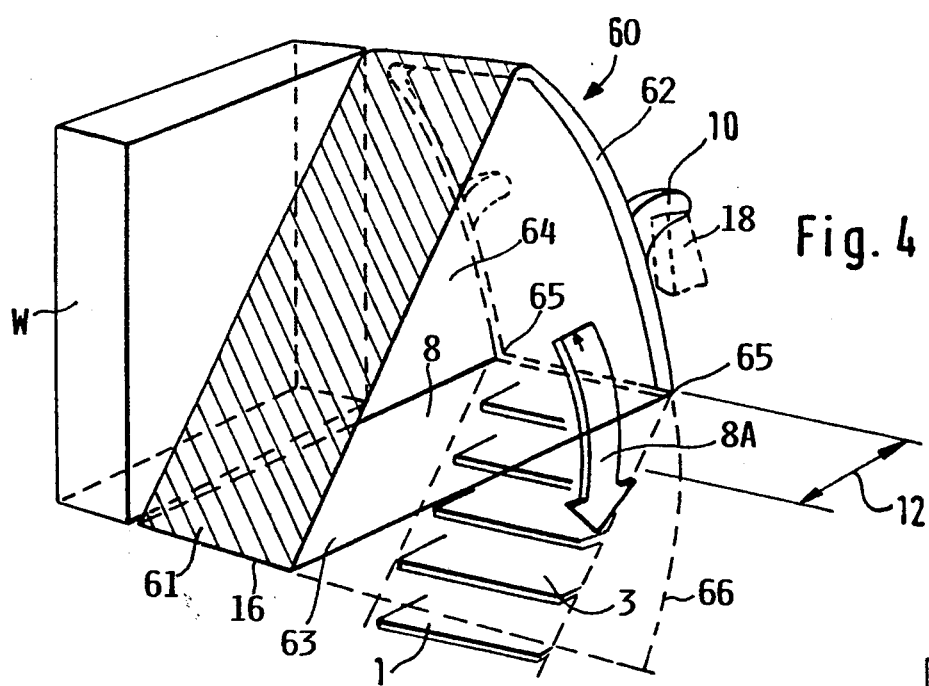
FIG. 4 is a perspective view of the tiltable stairwell enclosure or housing.

In the embodiment shown in FIGS. 4 and 5, the stationary or fixed housing component 40 of the stairwell is positioned below the upper deck UD on the lower deck LD and the movable or positionable housing component 60 is hinged at 16 to the upper deck UD for movement up or down around the hinge 16 as indicated by the arrow 8A into and out of the stairwell formed by the opening 8. When the movable component 60 is in the recessed position its hatched surface 61 forms part of the floor, thereby increasing the available floor space at least to the extent indicated by the arrow 12. The movable component 60 has a front frame 62 and preferably also side walls 63 and 64. Sufficient openings 65 are provided for the front frame 62 to travel downwardly as indicated by the dashed line 66, whereby corresponding spaces are provided to the right and left of the stair 1 for the side walls 63, 64. The dash-dotted line in FIG. 5 indicates the recessed position of the movable stairwell housing 60. The hand rail 10 has a separate upper end 17 hinged to the side wall 63 at 17A to tilt the upper end 17 out of the way as indicated by the arrow 17B for recessing the movable housing component 60. Sufficient clearance must be provided above the lower deck for accommodating the rest of the hand rail 10 in the recessed position, or rail 10 is foldable.

The upper end 17 of the hand rail 10 is preferably provided with a lighting fixture 18. The lighting fixture 18 is tilted out of the way together with the upper end 17 of the hand rail.

In order to prevent an excessively fast downward movement of the positionable or movable housing component 60, a movement damper such as a piston cylinder device 15 is arranged between the component 60 and a fixed point, such as the floor forming the upper deck UD. Such damping piston cylinder devices are conventional. Preferably, the damper 15 is positioned in the neighborhood of the hinge 16.

Incidentally, the hatched surface 61 of the movable component 60 is intended to illustrate a surface on which people may walk when the component 60 is in the recessed downward position.

Figure 6:
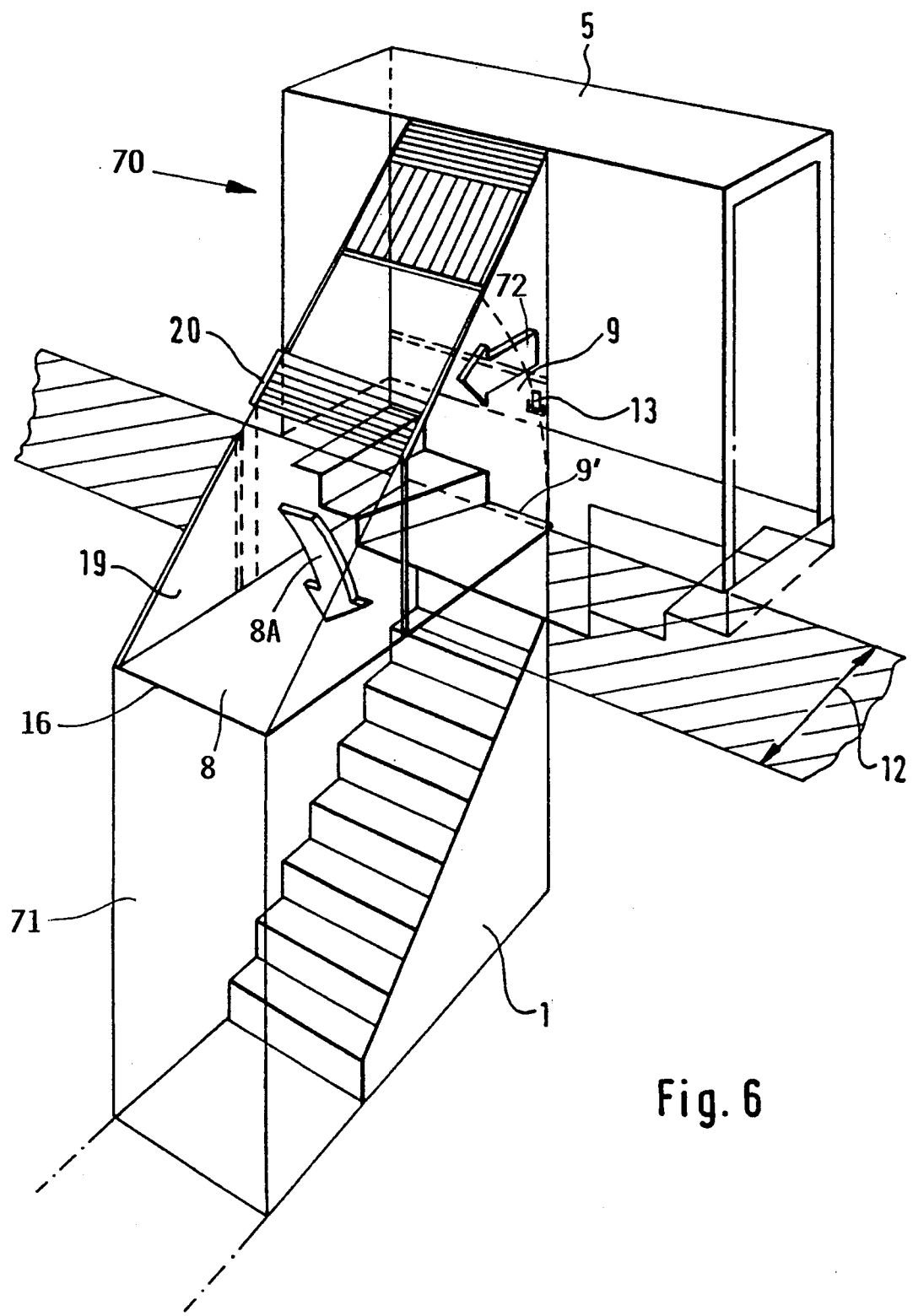
FIG. 6 is a perspective view of an embodiment of a stairwell structure including a tiltable or positionable component and a linearly displaceable stairwell housing component.

In the embodiment of FIG. 6 the stairwell housing 70 comprises a stationary or fixed component 5 and two movable components 19 and 20. These movable components 19 and 20 are constructed similar to the embodiment of FIG. 2, except that the component 19 is not stationary. Rather, the component 19 is hinged at 16 to a body portion 71 of the aircraft. The movable or positionable component 20 is shiftable in the direction of the arrow 72 while the tilting motion of the component 19 is indicated by the arrow 8A. The flap 9 is hinged at 9' to cover a portion of the stairs when the two components 19 and 20 are moved out of the way. First, the component 20 is shifted over the component 19 and then both components are tilted downwardly as indicated by the arrow 8A. When the components 19 and 20 are out of the way, the floor space 12 is gained, for example, when necessary in an emergency in front of an exit not shown.

Figure 7:
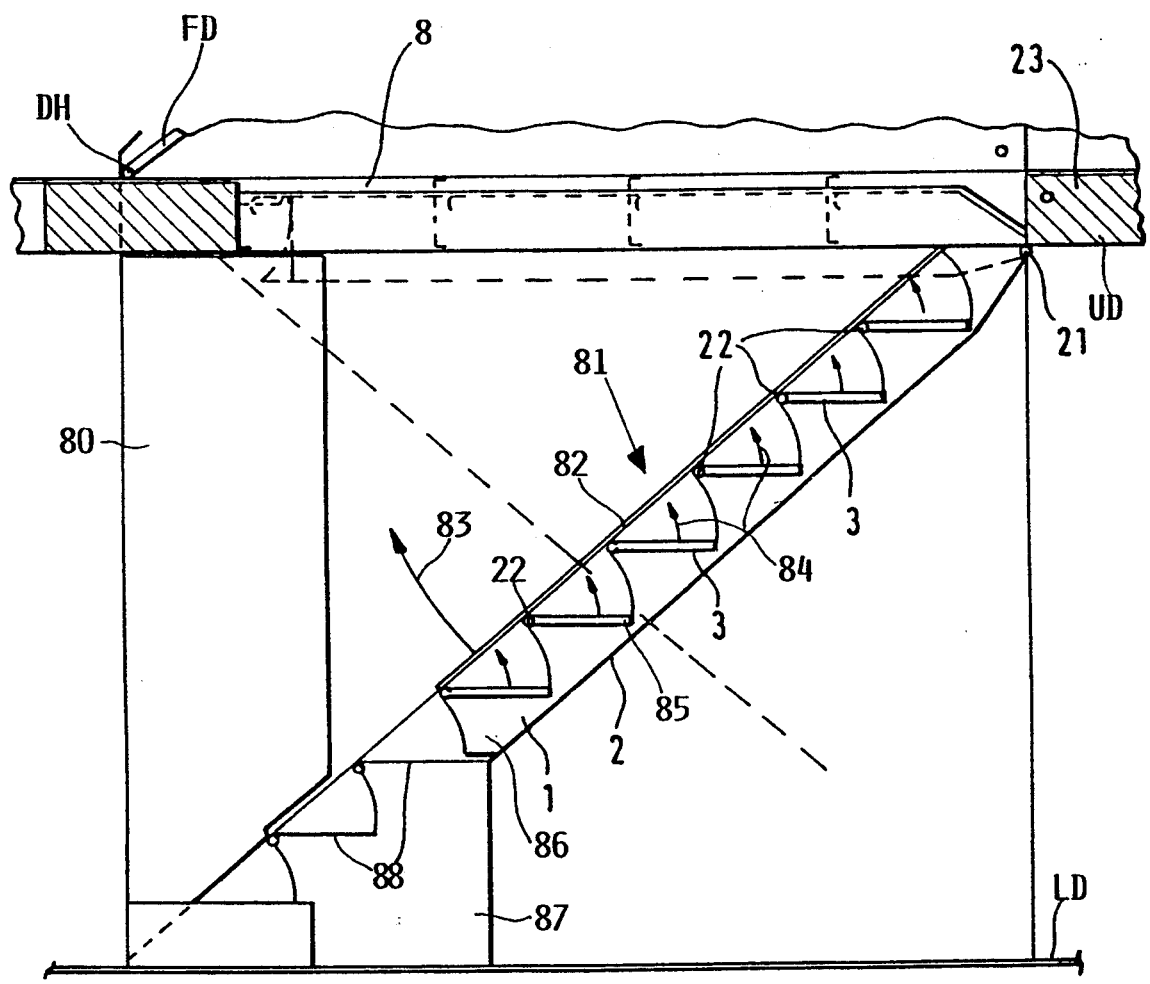
FIG. 7 illustrates a side view of an embodiment in which the individual treads of the stair are hinged to the stringers and the stringers are also hinged for tilting at least a portion of the stair out of the way.

FIG. 7 shows an embodiment in which the stationary or fixed stairwell housing component 80 and a movable stair portion 81 are both positioned below the upper deck UD. The movable stair portion 81 is formed as part of the stairs 1, whereby the stringers 2 of the stair portion 81 are connected by a hinge 21 to a floor stringer 23 of the upper deck UD. Thus, the portion 81 of the stair 1 can be moved in the direction of the arrow 83 to close the opening 8 in the upper deck UD. For this purpose, the individual treads 3 are hinged or journalled at 22 to the stringers 2 so that in the horizontal position of the movable stair portion 81 the treads 3 can be moved as indicated by the arrows 84 to completely close off the upper deck from the lower deck. Preferably, the tread edges 85 are provided with seals to prevent, for example, smoke from passing through the opening 8, e.g. from the lower deck to the upper deck when the treads 3 are in the horizontal position. In the shown open position of the stair portion 81, its lower end 86 rests on a pedestal 87 on the lower deck LD. The pedestal 87 also may comprise one or more stair steps 88 to complete the stair 1. Further, the treads are preferably locked in the horizontal position so that it is possible for a person to walk on these treads when they are in the horizontal position for completely closing the opening 8.

FIG. 7 also shows, partly broken away, a flap door FD hinged to the upper deck UD by a door hinge DH. The flap door FD forms the movable housing component.

Figure 8:
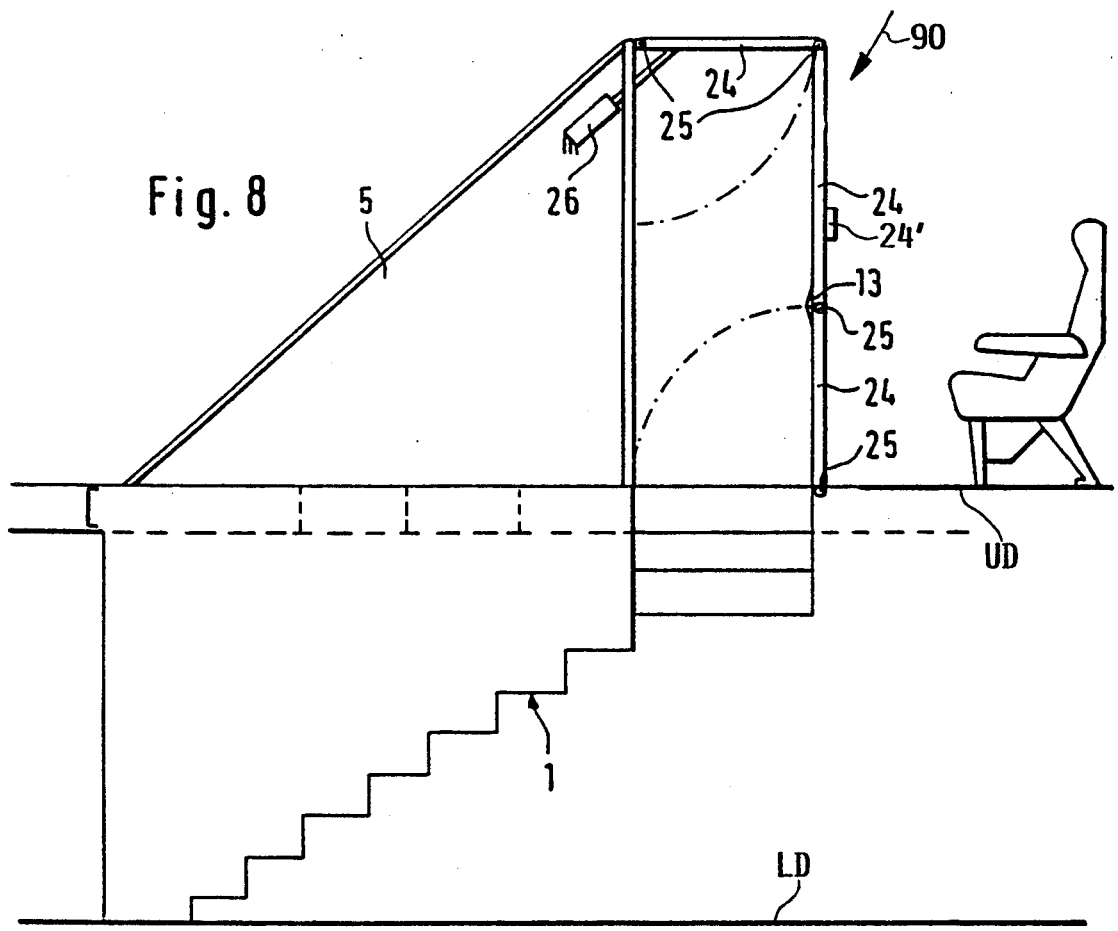
FIG. 8 illustrates a side view of an embodiment of a stairwell structure in which a portion of the stairwell housing is tiltable out of the way, whereby these positionable components are shown in a fully tilted-out positon providing access to the stair.
Figure 9:
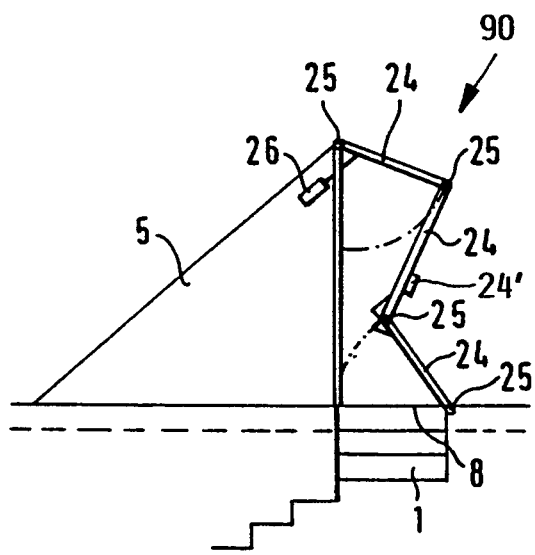
FIG. 9 illustrates schematically the tilting motions of the positionable components of the embodiment of FIG. 8 showing these components in a partly tilted-in position.
Figure 10:
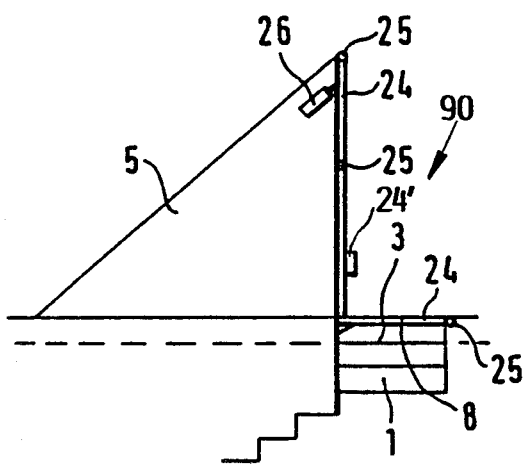
FIG. 10 illustrates the completely folded or tilted-in state of the positionable components of the embodiment of FIG. 8 in a schematic manner.

FIGS. 8, 9, and 10 illustrate a further embodiment in which a stationary or fixed stairwell housing component 5 cooperates with a movable or positionable housing component 90 which itself comprises several sections 24 and hinges 25 which interconnect the sections with each other and with the upper deck as well as with the stationary housing element 5. A damping device 26, such as a piston cylinder, is connected to the movable or positionable component 90 and to a fixed point to avoid an undesirable rapid move during a folding operation. A handle and lock 13 locks the sections 24 into the position shown in FIG. 8 in which the stairwell is open so that a person may pass through the opening and up or down the stairs 1. In the position of FIG. 8, the upper horizontal section 24 forms a roof while the vertical sections 24 form a side wall of the movable housing component 90. FIG. 9 shows the component 90 in a partially inwardly folded state. FIG. 10 shows the component 90 in the fully inwardly folded state, thereby completely covering the stairwell opening. Here again, the now upwardly facing surface of the lower now horizontally extending section 24 may be provided as a tread surface so that people may walk on it. A handle 24' facilitates the folding-in and folding-out operations.

Figure 5:
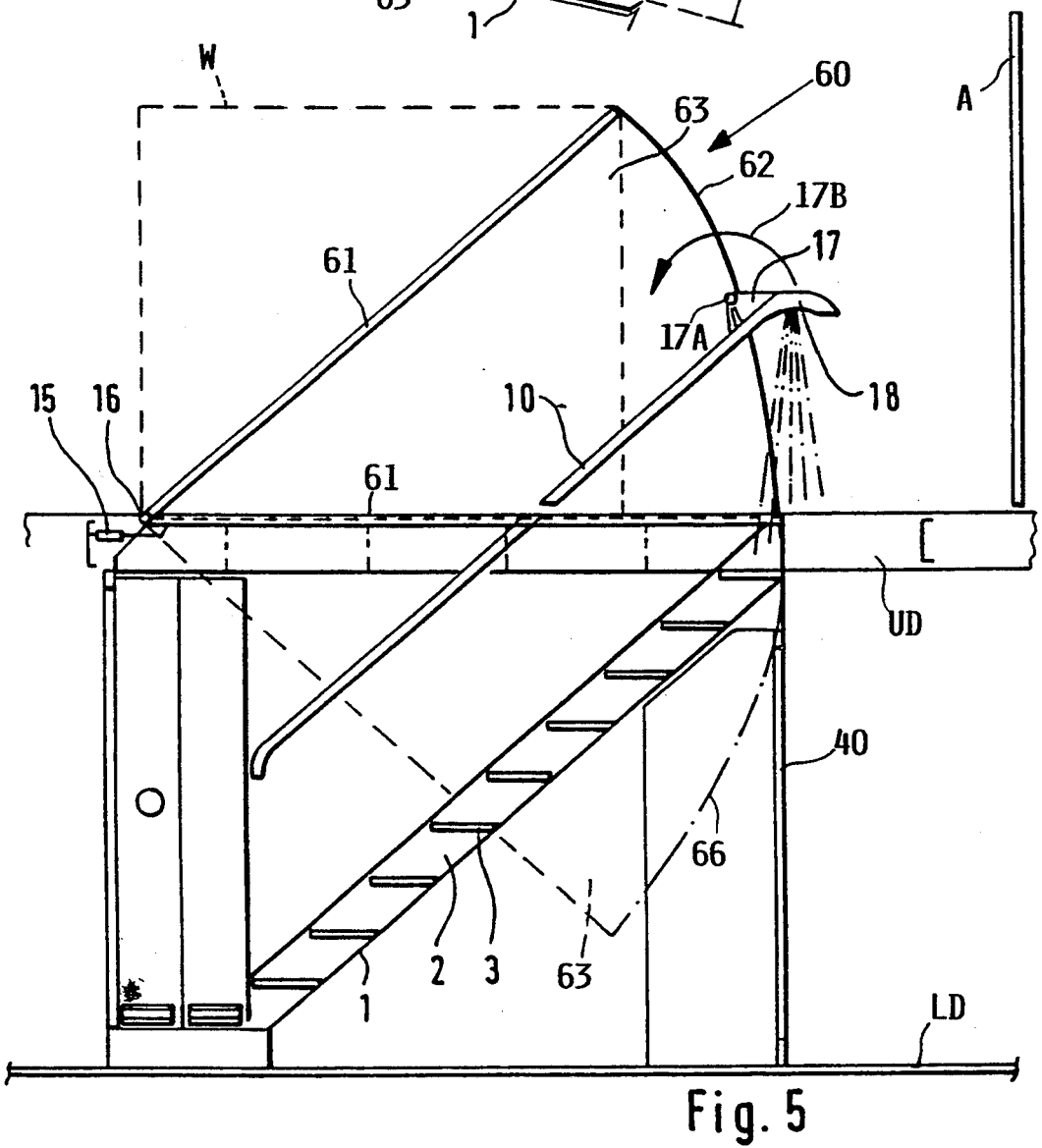
FIG. 5 is a side view of a tiltable stairwell enclosure embodiment of the invention.

A damping device as shown at 15 in FIG. 5 or at 26 in FIG. 8 may also be used in any of the other embodiments, for example, in FIG. 7. In all instances such a damping device makes sure that positional changes take place or are performed with a desirable speed. Further, these damping devices may be constructed to form a positive stop in the desired position so that an unintentional positional change is avoided.

Further, the positioning of the movable components may take place either manually as described, or with the aid of a suitable drive mechanism of conventional construction. Drive mechanisms may be operated automatically from a keyboard, for example, with the help of electric motors and corresponding drive translations. The automatic drive may take place in response to a particular programmed operational state of the structure. For example, in the embodiment shown in FIGS. 8, 9, and 10 an automatic drive can be used to make sure that the stairway is closed during starting and/or landing. Once the airplane has reached cruising speeds or after a landing is completed, the positionable device may be returned into the state shown in FIG. 8.

It is preferable that some or all of the components of the present stair and stairwell construction are made of fire resistant material so that, for example, fire on one deck can be prevented from spreading to another deck. Similarly, it is preferable to provide proper seals around the movable components and/or the stationary components to prevent smoke from reaching from one deck to the other.

Although the invention has been described with reference to specific example embodiments, it will be appreciated that it is intended to cover all modifications and equivalents within the scope of the appended claims.

What we claim is:

1. A stair and stairwell construction for connecting an upper deck and a lower deck through an opening in said upper deck, comprising stair treads, stringers, means securing said stair treads to said stringers to form said stair, a stairwell housing comprising a fixed housing component and at least one positionable housing component positionable relative to a deck surface of said upper deck, said stairwell construction further comprising locking means (13) for fixing said at least one positionable housing component in a first operational position permitting a passage through said stairwell housing on said stairs, said locking means (13) also maintaining said at least one positionable housing component in a second position for preventing such a passage when said positionable housing component is covering at least partly said opening in said upper deck, said at least one positionable housing component thereby increasing an available floor space of said upper deck when said opening is at least partly covered by said positionable housing component.

2. The stair and stairwell construction of claim 1, wherein said at least one positionable housing component completes said stairwell housing while simultaneously permitting said passage when said stairwell housing is in an extended position, said positionable housing component preventing said passage when said stairwell housing is in a recessed position.

3. The stair and stairwell construction of claim 1, further comprising at least one flap (9) provided in said stairwell housing for closing said opening in said upper deck, said opening being exposed by a change in the position of said positionable housing component.

4. The stair and stairwell construction of claim 3, wherein said flap (9) comprises two flap sections.

5. The stair and stairwell construction of claim 1, wherein said at least one positionable housing component forms part of said stairwell housing, said construction further comprising a hinge for journalling said at least one positionable housing component in a tiltable manner.

6. The stair and stairwell construction of claim 1, wherein an upper cover of the stairwell housing is constructed as a surface on which people can walk.

7. The stair and stairwell construction of claim 1, wherein said at least one positionable housing component is constructed of a plurality of sections (24), said construction further comprising hinge means (25) interconnecting said sections with each other, with said stairwell housing, and with said upper deck, whereby said sections are tiltable relative to each other for folding, and wherein at least one of said sections (24) is constructed as a floor element on which people can walk when said floor element is in a folded-in state.

8. The stair and stairwell construction of claim 1, further comprising a hinge (21) for hinging said stringers of said stair to said upper deck, whereby said stair and stair treads are tiltable between a lowered use position and a raised closed position.

9. The stair and stairwell construction of claim 8, wherein said means securing said stair treads to said stringers comprise journals (22) for tiltably securing said stair treads to said stringers.

10. The stair and stairwell construction of claim 1, further comprising damping means for cushioning said at least one positionable housing component when said positionable housing component is moved from one position into another position.

11. The stair and stairwell construction of claim 1, wherein said at least one positionable housing component is constructed as a fire protection element.

* * * * *

UNITED STATES PATENT AND TRADEMARK OFFICE
CERTIFICATE OF CORRECTION

PATENT NO. : 5,395,075
DATED : March 7, 1995
INVENTOR(S) : Sprenger et al.

It is certified that error appears in the above-identified patent and that said Letters Patent is hereby corrected as shown below:

Column 3, line 8, replace "a" (second occurrence) by --the--.

Column 3, line 17, after "way" insert --and wherein a flap door forms a movable housing component--.

Signed and Sealed this

Ninth Day of May, 1995

*Attest:*

BRUCE LEHMAN

*Attesting Officer*     *Commissioner of Patents and Trademarks*